350-3.69 SR
XR 3,807,859
TX 3050Y
X 3040 W

United States Patent [19]
Sugaya et al.
[11] 3,807,859
[45] Apr. 30, 1974

[54] INFORMATION INPUT SYSTEM USING HOLOGRAPHY

[75] Inventors: Shoji Sugaya, Nishinomiya; Tadashi Hikita; Yasuhiro Ishii, both of Ogaki; Osamu Ota; Uoji Sawada, both of Gifu-ken, all of Japan

[73] Assignee: Sanyo Electric Co., Ltd., Moriguchi-shi, Osaka-fu, Japan

[22] Filed: Apr. 20, 1972

[21] Appl. No.: 245,859

[30] Foreign Application Priority Data

Nov. 11, 1971 Japan ................ 46-90225
Nov. 11, 1971 Japan ................ 46-90226
Nov. 11, 1971 Japan ................ 46-90227

[52] U.S. Cl. ................ 356/71, 340/149 A, 350/3.5
[51] Int. Cl. ................ G06k 9/08
[58] Field of Search ................ 356/71; 350/162 SF; 340/149 A

[56] References Cited

UNITED STATES PATENTS

| | | | |
|---|---|---|---|
| 3,643,216 | 2/1972 | Greenaway et al. | 340/149 A |
| 3,514,754 | 5/1970 | Schwend | 340/149 A |
| 3,564,500 | 2/1971 | Cook | 340/149 A |
| 3,542,448 | 11/1970 | Reynolds et al. | 350/162 SF |
| 3,559,175 | 1/1971 | Pomeroy | 340/149 A |
| 3,573,731 | 4/1971 | Schwend | 340/149 A |
| 3,697,149 | 10/1972 | Van Heeckeren et al. | 350/162 SF |

*Primary Examiner*—Vincent P. McGraw
*Attorney, Agent, or Firm*—Staas, Halsey & Gable

[57] ABSTRACT

An identification card having six-digit numerical information is prepared which comprises six information unit or digit hologram areas arranged in a predetermined direction, each having a hologram prepared based on an optical pattern of a combination of opaque and transparent portions in four predetermined bit positions being located commonly to all the information units for identifying a decimal number in the corresponding digit.

The card is verified by comparing a bit signal representative of said six-digit numerical information obtained by a holography reconstruction system on a digit-by-digit basis as the card is transported with respect to the reconstruction system and another bit signal generated based on corresponding six-digit numerical information of the card normally being memorized by a card holder.

23 Claims, 10 Drawing Figures

3807859
OR IN 356/71

INFORMATION INPUT SYSTEM USING HOLOGRAPHY

BACKGROUND OF THE INVENTION

1. Field of the Invention

The present invention relates to an information input system and more particularly to an improvement in such system for entering the information into an electronic processing machine by the use of holography.

2. Description of the Prior Art

A typical means of late for processing information is an electronic processing machine. With such an electronic processing machine are required means for recording given information in a recording medium and for reproducing or reading out the recorded information therefrom for the purpose of entering the information as an input signal to the electronic processing machine and taking the information therefrom as an output signal. Hitherto, punch cards, punch tapes, magnetic tapes, etc. have been used for this purpose.

One of the most specific applications of the information recording media used in connection with electronic processing machines may be a personal identification card, such as credit identification card, personal identification card for automatic vending machines. Such a card usually comprises the information for identifying the card holder recorded in the recording medium therein so that the information can be processed in the electronic processing machine used in connection therewith. Since such a card is normally carried by the card holder, not only the card itself but also the recording medium therein are required to be durable and safe from soiling, damage, magnetic influence etc.

Such a card of relatively simple form comprises the identification information such as identification number indicated by an emboss configuration of the numerals so that the numerical information can be processed either visually through human eyes or by the machine through physical contact therewith. This type of card has an advantage of enabling visual verification of the identification information but just for the same reason it enables fraudulent use thereof by somebody other than the card holder, resulting in a great disadvantage. Another known type of the card comprises the identification information recorded in the recording medium in such a manner as not to allow direct access by people other than the card holder. For the purpose of using the card, the holder of this type of card or an operator of the machine is to manually enter his identification information normally memorized by the holder in the electronic processing machine, while inserting the card in the machine for reproduction of the information recorded therein. The identification information given by the card holder is then compared in the electronic processing machine with the identification information reproduced based on the information recorded in the card. Secure identification or verification of the card holder can thus be accomplished. This type of the identification card may be implemented by providing therein a magnetic film for magnetic recording of the indentification information.

A more preferable technique has been proposed, which utilizes a type of card hardly accessible to the identification information recorded in the recording medium by people other than the card holder. Such prior art comprises an identification card including a hologram as storage means for the identification information and a card verification system for identification of the card holder. The hologram card of said prior art comprises a hologram recording medium, in which are recorded 6-digit numerals, each thereof composed of 4 bits for a binary coded decimal or BCD format, for example. These 24 bits, in all, of information are allotted predetermined positions in a predetermined irregular arrangement for the purpose of keeping the information secret so that the 6-digit numerals are as a whole represented by a combination of a logical state at the 24 allotted bit positions. The 6-digit numerical information thus afforded are recorded in the hologram record medium by means of a holography recording system. The hologram card is inserted in the holography reconstruction system and the information stored in the hologram is reconstructed or reproduced as a combination of a logical state combination in said 24 bit positions. In the holography reconstruction system 24 photosensors are provided at positions corresponding to said 24 bit positions of the information in the card for detection of said logical state combination. The output of these photosensors clearly represents the card holder's identification information. Then comparison is made of the information signal the card holder has entered in the electronic processing machine with said reproduced information signal for verification of the card holder.

Despite such many advantages over the other prior arts, the abovementioned prior art is disadvantageous in that the holography record and reconstruction systems are too complicated, since no specific consideration has been given to the systems for storing information in the hologram record medium as well as for reconstruction of the stored hologram information. Thus, with the abovementioned prior art there is much room for further improvement. Some improvement in such prior art might provide a new application of the hologram record medium in the field of information input system in electronic information processing machines.

SUMMARY OF THE INVENTION

In accordance with this invention, an information record medium comprises a hologram record medium area, which comprises a plurality of information unit areas arranged in a predetermined direction, each having a hologram representative of the respective information unit to be stored therein. In a preferred embodiment of the present invention, each hologram is a hologram recorded by means of a conventional holography record system based on an optical pattern, typically a dot pattern, including a combination of logical states, represented by opaque and transparent dots, for example, in a plurality of bit positions located in a predetermined manner common to all information units.

The information contained in the information record medium can be entered into an electronic information processing machine by the use of an information input system in accordance with the present invention. Such system comprises a holography reconstruction system adapted to reconstruct the original optical pattern, typically the dot pattern, of any information unit, and a means for scanning the information record medium by said holography reconstruction system for responding the reconstructed original optical pattern of each information unit in turn by said holograph reconstruction system as the medium is scanned for providing a signal representative of the corresponding information unit.

In a preferred embodiment of the present invention, the information record medium is used as an identification card. In using the card, a card holder or an operator inserts the card into a verification apparatus and also enters identification information normally memorized by the card holder to the apparatus by means of a key board, for example. The verification apparatus comprises a transport station for transporting the card in the direction of the arrangement of the information units areas in the hologram record medium area of the card, a holography reconstruction system adapted to reconstruct the dot pattern of any information unit in turn, as the card is transported, including a plurality of photosensors, corresponding to said plurality of bit positions. The identification signal thus entered by the card holder and the identification signal thus obtained by the photosensors from the card are compared for verifying the card holder. As a result, the present invention provides a card identification system which allows a holography reconstruction system of a simplified structure and also a holography identification card of easy writing or storing of the identification information therein.

In accordance with a preferred embodiment of the present invention, the information record medium or identification card is prepared to comprise a plurality of Fraunhofer phase holograms each being representative of the information unit. Such medium or card makes the holography reconstruction system more simple and verification more accurate.

Therefore, an object of the present invention is to provide an improved information input system using holography.

Another object of the present invention is to provide an information record medium for use in the information input system, which comprises hologram identification information in an improved manner.

A further object of the present invention is to provide an information record medium comprising a plurality of information units of hologram arranged in a given direction.

Still a further object of the present invention is to provide an information record medium comprising a plurality of information units of hologram arranged in an order suitable for sequential holography reconstruction of the hologram.

A further object of the present invention is to provide an information record medium comprising a plurality of information units, each comprising a hologram of a combination of a logical state in a plurality of predetermined bit positions.

It is another object of the present invention to provide an information input system for entering the information contained in the information record medium into an electronic information processing machine, said medium comprising a plurality of information units of hologram arranged in an order suitable for sequential holography reconstruction of the hologram.

It is a further object of the present invention to provide a card verification system for verifying an identification card comprising a plurality of information units of hologram arranged in an order suitable for sequential holography reconstruction of the hologram.

It is a further object of the present invention to provide an identification card comprising a plurality of information units of hologram arranged in a sequential order and having geometry suitable for sequential accurate reconstruction of the hologram.

These objects and other objects and features of the present invention will become apparent from the following detailed description of the preferred embodiments taken in conjunction with the accompanying drawings.

DESCRIPTION OF THE PREFERRED EMBODIMENTS:

Prior to a detailed description of a preferred embodiment of the present invention, it is considered appropriate to give a brief description about the principle of holography.

Figure 1A:
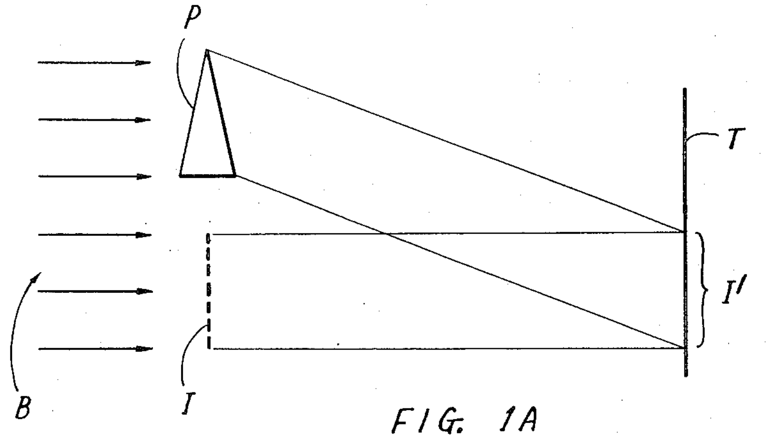
FIG. 1A is a simplified illustration of a basic principle of a hologram recording system.

FIG. 1A is a simplified illustration showing the principle of a holography recording system. Now referring to FIG. 1A, a laser beam B is directed through a prism P and an information pattern I to an optical recording medium T, such as a photographic film. A portion of the beam B directed to the information pattern I is further directed therethrough to a hologram record area I' of the film T, while another portion of the beam B directed to the prism P is deflected so as to be directed toward the same hologram record area I'. The former portion of beam is called a diffracted beam, while the latter portion thereof is called a reference beam. As a result, in said hologram area I' is formed an interference fringe of a pattern corresponding to the optical pattern included in the optical information pattern and this interference fringe is optically recorded on the recording medium. As well known, this interference fringe is called a hologram.

Figure 1B:
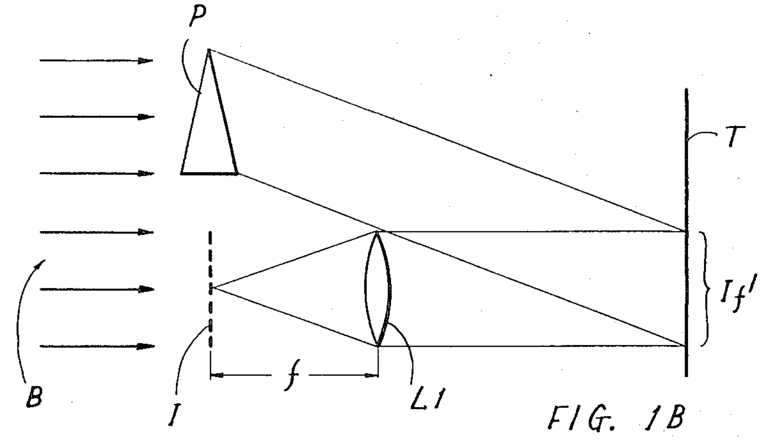
FIG. 1B is a similarly simplified illustration of a basic principle of a hologram recording system in accordance with Fraunhofer holography.
Figure 1C:
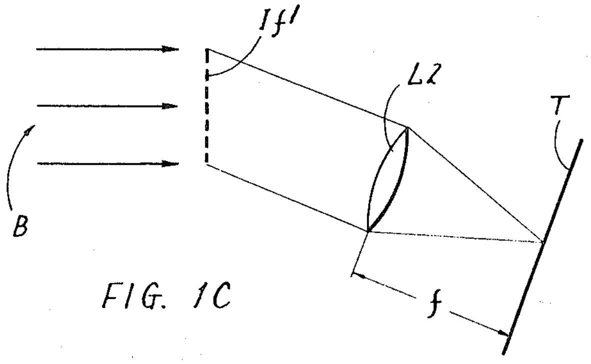
FIG. 1C is a similarly simplified illustration of a basic principle of a hologram reconstruction system.

FIG. 1B is a simplified illustration showing the principle of the Fraunhofer holography recording system. With the Fraunhofer holography a lens L1 is placed in the path of the information beam, with its position so selected that the lens' focus may be located at the information pattern I. As a result the Fraunhofer hologram If' is recorded on the recording medium I. The other portions of this system are the same as those in the recording system shown in FIG. 1A and therefore like portions are denoted by like reference characters.

In reconstruction of an ordinary hologram If or Fraunhofer hologram If', a light beam B of high monochromatims such as a laser beam is directed to the hologram If'. The resultant refracted beam is directed through a lens L2 to the target T placed in the focal plane of the lens L2. As a result, the real image of the information pattern is reconstructed or reproduced on the target T. In case the original optical pattern of the Fraunhofer hologram If' is reconstructed in the reconstruction system, the reconstructed real image stands still regardless of translational displacement, without any rotation, of the hologram If' in any direction in the plane in which it exists. With understanding of the foregoing brief explanation as to the principle of the holography, a detailed description of the present invention will be given hereinafter.

Figure 2:
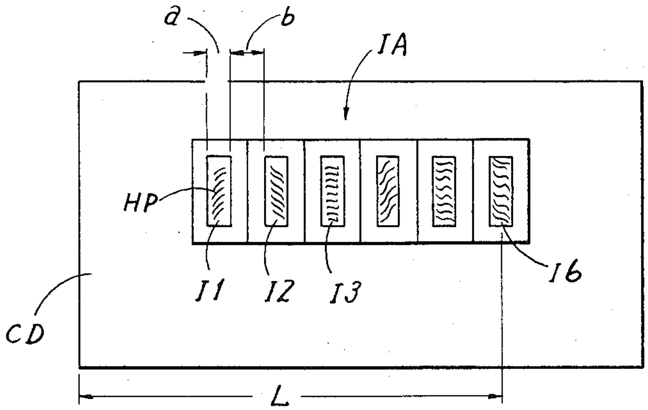
FIG. 2 is a plan view of an identification card in accordance with an embodiment of the present invention.

FIG. 2 is a simplified illustration of an example of identification card prepared according to the present invention. A card CD has an information area IA. This information area IA is composed of a plurality of information unit hologram areas, I1, I2, I3 . . . I6, arranged in a predetermined direction, preferably along a straight line, each thereof containing a hologram area HP representing, for example, one of numerals 0, 1, 2, 3 . . . 9.

In the embodiment shown, each information unit is described as representing one of the decimal numerals, 0, 1, 2, 3 . . . 9. Alternatively, however, this information unit may be used to represent a different character such as an alphabet, if so desired. For this purpose any proper modification may be possible to those skilled in the art. It is to be pointed out that the present invention comprises also such embodiments.

Figure 3:
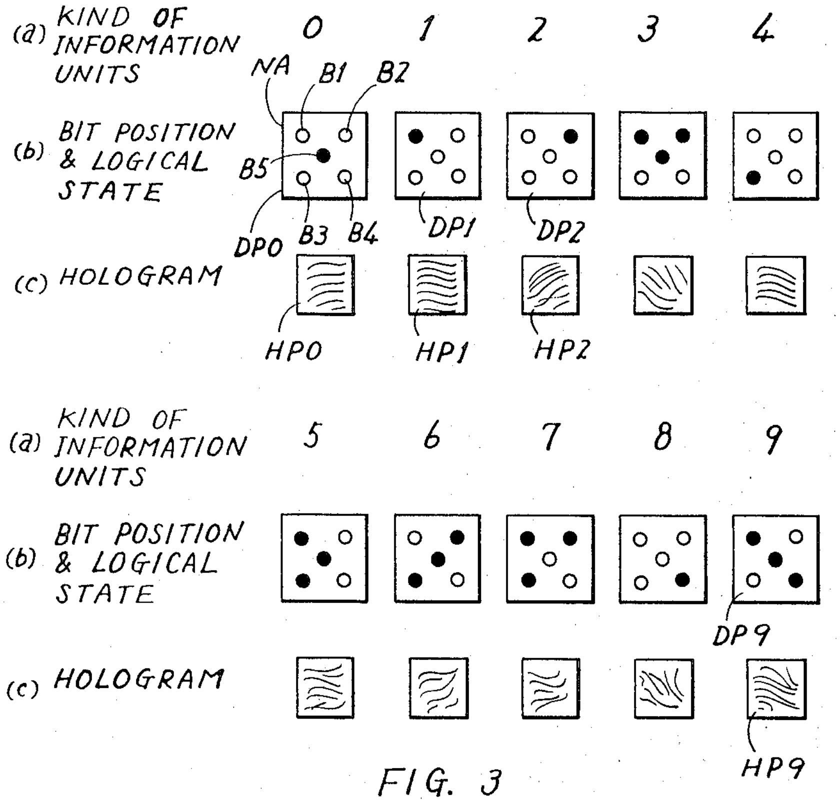
FIG. 3 is a schematic representation of the relation between the information units for use in the card, dot patterns representative of the information units, and corresponding holograms representative of the units.

Now, preparation for the hologram for each information unit hologram area will be described. Each of the information units, I1, I2, I3 . . . I6, has a hologram HP representative of, for example, one of the numerals 0, 1, 2, 3 . . . 9 and for this purpose every numeral has a particular coded optical dot pattern allotted thereto. In FIG. 3 is shown a set of such optical dot patterns for each numeral for use in preparation of the corresponding hologram. Now referring to FIG. 3, each numeral is afforded a numeral representing area NA of a common size and each of the numeral representing areas has five bit positions, B1, B2, B3, B4 and B5, allotted thereto commonly to any other numeral representing area. Four of them B1, B2, B3 and B4, in a circumference, each having a dot-like area, are used to represent individual numerals by the binary coded decimal system, for example, while the remaining one in the center, B5, having a like dot-like area, is used as a bit for parity check in the logical processing of the bit signals represented by such bit positions, B1, B2, B3 and B4, this being called a parity bit. Thus, a logical state for representing each numeral is allotted as an opaque dot, represented by a black dot, or a transparent dot, represented by a white dot, to each of dot-like areas in the 4 bit positions off the center. In the illustrated example the black dot bit position represents logic one, while the white dot bit position represents logic zero. Thus, it is to be understood that individual numerals can be represented by a combination of logical states or of black and white dots in the 4 common bit positions, B1, B2, B3 and B4. The parity bit position is also allotted thereto, for the aforementioned purpose, a logical state or a black or white dot.

Combinations of logical state dots at the plurality of bit positions corresponding to each of the numerals 0, 1, 2, 3 . . . 9 as shown in FIG. 3, namely dot patterns DP0, DP1, DP2 . . . DP9, are converted by means of a holography recording system as shown in FIGS. 1A and 1B into holograms HP0, HP1, HP2, HP3 . . . HP9, respectively. It may be readily seen that, though these holograms comprise the corresponding numerical information, the numeral represented by each hologram is inaccessible by anybody directly from said pattern. The card CD shown in FIG. 2 comprises the information units I1, I2, I3 . . . I6, selected and allotted, as desired, from these holograms HP0, HP1, HP2, HP3 . . . HP9. Thus, it is seen that the card CD shown in FIG. 2 contains numerical information of 6 digits in a set of holograms hardly or not directly perceptible to the human eyes.

Simply, the card CD can be prepared by allotting the optionally selected hologram HP0, HP1, HP2 . . . HP9 shown in FIG. 3, as prepared in advance, to individual information unit areas I1, I2, I3 . . . I6 of the information area IA of the card CD. For this purpose, the information unit areas I1, I2, I3 . . . I6 are made of transparent film (not shown) and the hologram HP0, HP1, HP2 . . . HP9 may be pasted thereon, as desired. Alternatively, the information unit areas I1, I2, I3 . . . I6 are formed of photo-sensitive film and any selected hologram may be formed on each of the areas I1, I2, I3 . . . I6 by a photographic method on a digit-by-digit basis, as the card is moved successively.

Typically, the holograms may be prepared as monochromatic or contrast interference fringes printed on a photographic film. The holograms may as well be expressed as relief patterns produced on the recording medium corresponding to the interference fringes, such hologram being called a phase hologram. In any case, however, the hologram may preferably be of a Fraunhofer type.

Figures 4, 5, 8:
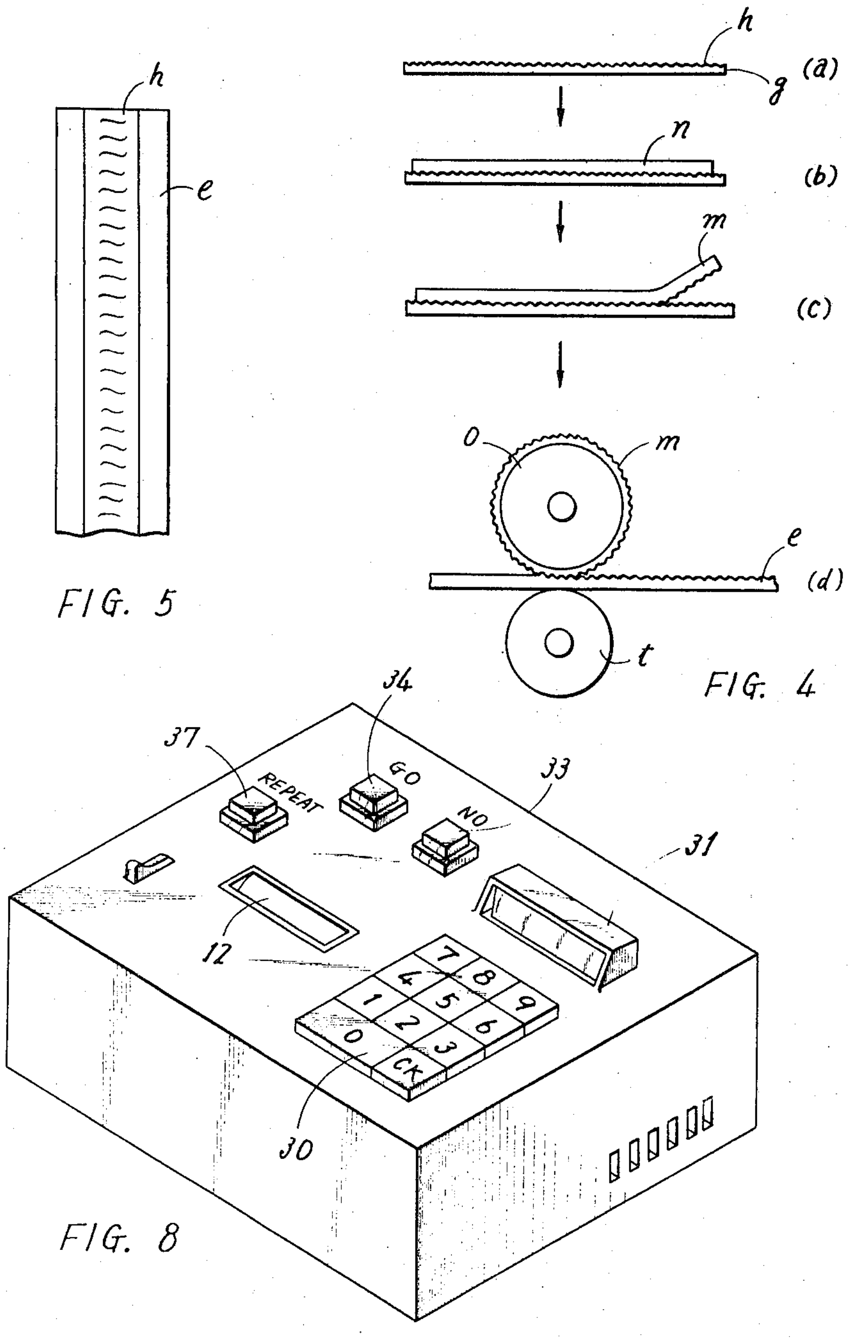
FIG. 4 shows steps for preparing a plurality of holograms representative of any information unit.
FIG. 5 illustrates a hologram strip including a plurality of the same hologram prepared based on the steps shown in FIG. 4.
FIG. 8 is a perspective view of a card verification apparatus of an embodiment in accordance with the present invention.

Referring to FIG. 4, there is described hereinafter a preferred method of preparing in advance holograms corresponding to all kinds of information units for identification cards. First, as shown in FIG. 4(*a*), a phase hologram master h is prepared. Such a phase hologram can be prepared on the recording medium by a conventional holography process by the use of a photographic material such as a photo resist. Then a nickel layer is formed on the phase hologram master h by galvanizing process and subsequently, as shown in FIG. 4(*b*), the deposited nickel layer is peeled off the original hologram by a known method and the nickel master m is thus provided (see FIG. 4(*c*)). Then the nickel master m is attached to the periphery of a heated roller *o*, which cooperates with an auxiliary roller *t*. By passing a thermoplastic sheet through between both rollers *o* and *t*, a hologram sheet e having a plurality of the same hologram can be manufactured with ease, as shown in FIG. 5. This hologram sheet is cut unit after unit to provide a plurality of holograms of corresponding information units. As mentioned above, these holograms can be used advantageously in the preparation of a card as shown in FIG. 2.

Another preferred method of preparing a hologram pattern for each information unit includes the use of the hologram master shown in FIG. 4(*c*) as a type for a printing mechanism. More specifically, the master shown in FIG. 4(*c*) may be mounted on any printing machine instead of the ordinary type. The information unit regions I1, I2, I3 . . . I6 of the card CD shown in FIG. 2 are made of a transparent thermoplastic material. Such card CD is placed on a heated plate and by the use of a printing machine of the aforementioned type the desired holograms may be printed successively on the regions I1, I2, I3 . . . I6, on a digit-by-digit basis.

Figure 6:
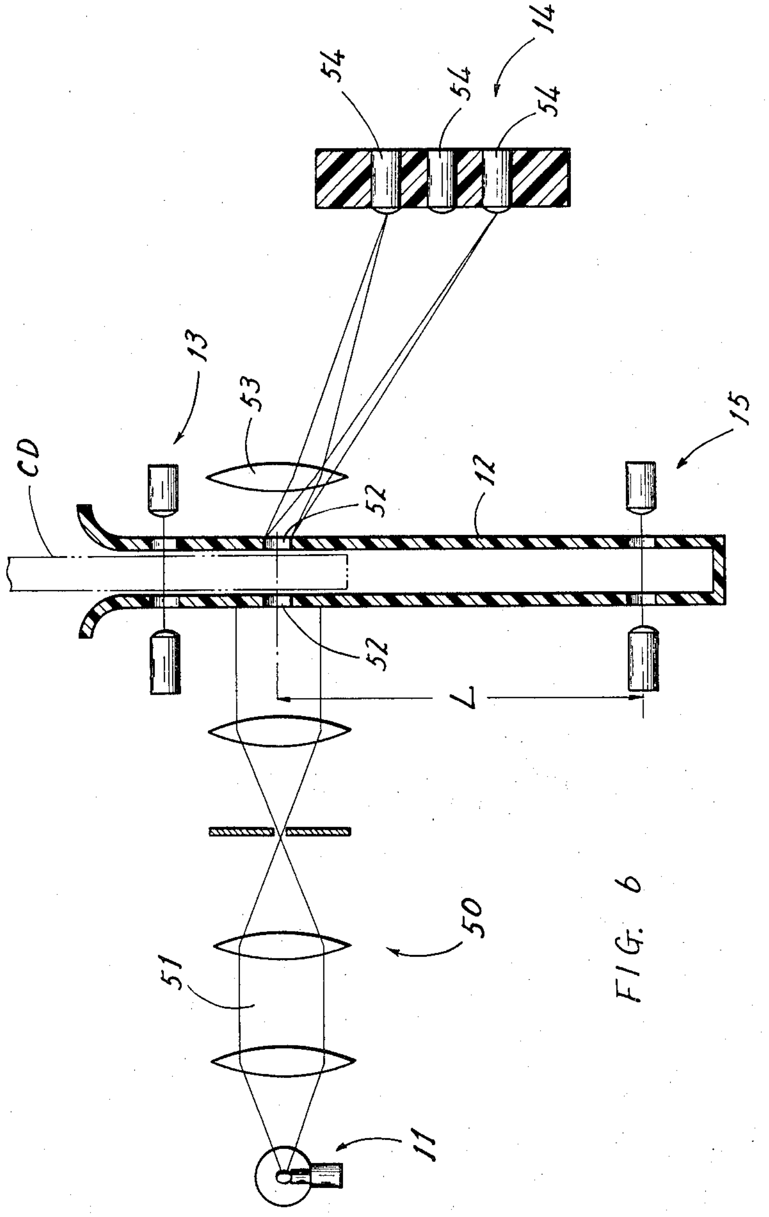
FIG. 6 is a schematic representation of a holography reconstruction system shown in FIG. 7.

Now, referring to FIGS. 6 and 7, a holography reconstruction system and a card verification system of an embodiment in accordance with the present invention will be described in detail. Referring particularly to FIG. 6, a card receptacle 12 is provided for sequentially positioning the respective information unit hologram areas I1, I2, I3 . . . I6 of the card CD (see FIG. 2) with respect to a hologram reconstruction system 50. Geometry of the inner structure of the receptacle 12 has been so chosen as to receive the card CD in a direction of arrangement of the information unit hologram areas I1, I2, I3 . . . I6. Any suitable means such as a notch, indicia, etc. may be provided on the card CD for discrimination of a leading edge and a trailing edge of the card CD for the purpose of inserting the card into the receptacle in a proper direction. The geometry of the inner structure of the receptacle 12 has also been so chosen that the card CD can be inserted and brought into the innermost position of the receptacle 12 eventually only through depression by a hand of an operator, for example, against the friction between the inner surface of the receptacle and the outer surface of the card. Thus, gradual insertion of the card CD into the receptacle 12 through depression by the operator can perform transportation of the card through the receptacle with respect to the holography reconstruction system 50. Such transportation or displacement of the card CD with respect to the holography reproduction system 50 can provide preferred means for scanning the series arranged hologram areas I1, I2, I3 . . . I6 of the card CD by means of the holography reconstruction system 50. Alternatively of the manual driving of the card, however, the system may be provided with any suitable mechanical driving means for automatic transportation of the card through the receptacle.

The holography reconstruction system 50 comprises a light source 11 for emitting a light beam, preferably a monocolor light beam such as a laser beam, an optical system 51 including a set of lenses for providing a parallel light beam toward an opening 52 of the receptacle 12, and a photosensor assembly 14. An opening or window 52 has a transparent area commensurate with any one of the information unit hologram areas I1, I2, I3 . . . I6 of the card CD being inserted into the receptacle 12. The photosensor assembly 14 is so positioned tht an original optical pattern or image of each information unit hologram may be reconstructed or reproduced at the surface thereof in accordance with the principle as described with reference to FIG. 10. If the Fraunhofer hologram has been employed in the card CD, then the hologram reconstruction system includes a lens 53 for reconstruction of such hologram. The photosensor assembly 14 is provided with a plurality of photosensitive devices 54 such as photo transistors arranged in a format similar to the dot position shown in FIG. 3, so that a logical state in any dot position may be sensed by the corresponding photosensitive device 54.

At an upper portion of the receptacle 12, is provided a photo detection device 13 typically including a lamp and a photo transistor for detecting the insertion of the card CD into the receptacle 12. At a bottom portion of the receptacle 12 is also provided another photo detection device 15 similarly including a lamp and a photo transistor for detecting whether the card CD has reached the innermost or ultimate insertion position. Operation of these photo detection devices 13 and 15 will be described in detail hereinafter with reference to FIG. 7.

Figure 7:
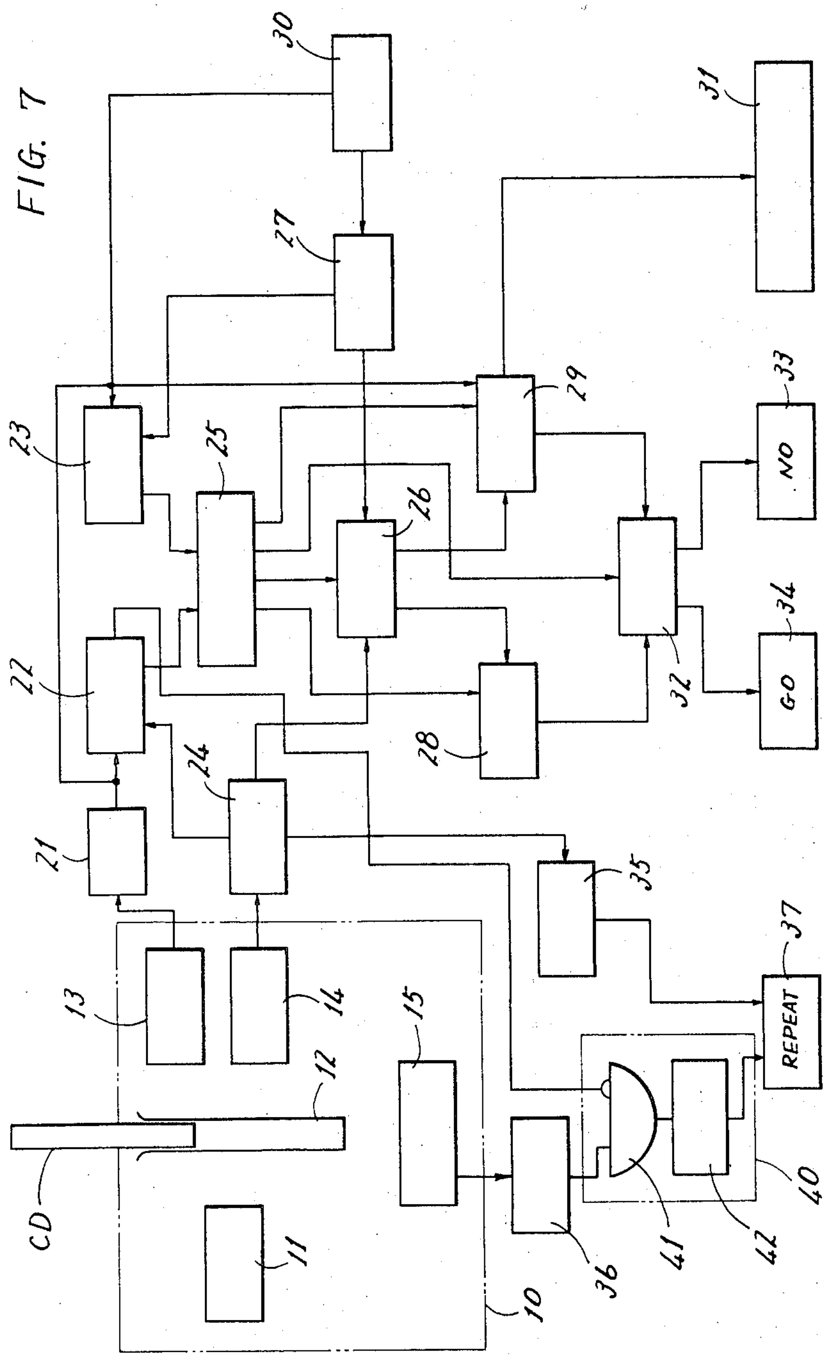
FIG. 7 is a block diagram of a card verification system in accordance with an embodiment of the present invention.

Referring to FIG. 7, there is shown a block diagram of a card verification system of an embodiment in accordance with the present invention. A card transport station 10 is shown in a simplified manner, through it was illustrated in some detail in FIG. 6. Responsive to insertion of the card CD into the receptacle 12, the card insertion detector 13 provides an output signal representative of passage of the leading edge of the card CD, which is fed through a wave shaping circuit 21 to a first counter 22 and a second counter 23 to reset both counters or to place them in an initial condition. When the first information unit hologram area I1 of the card CD comes to the same position as the opening 52, as the card is inserted and transported through the receptacle 12, the original dot pattern of the corresponding information unit of the hologram area I1 is reconstructed or reproduced on the photosensor assembly 14 so that each dot of the dot pattern is superposed on the corresponding photosensitive device 54. As a result the photosensor assembly 14 provides a 4-bit signal of parallel type representative of the information corresponding to the information unit or numeral and a 1-bit signal representative of a parity bit information recorded in the information unit area I1 of the card CD in the form of hologram. This 4-bit signal is fed through a wave shaping circuit 24 to a buffer register 26 to be stored therein. The said 4-bit signal is also fed through the circuit 24 to the first counter 22 to cause the counter 22 to count up by one. The count up by one in the counter 22 controls via a control 25 addressing in a card register 28 so that the said 4-bit signal stored in the buffer 26 is stored in a specified address or cell positions in the register 28 as a function of the count in the counter 22.

When the second information unit hologram area I2 of the card CD comes to the same position as the opening 52, as the card CD is further transported through the receptacle I2, the original dot pattern of the corresponding information unit of the hologram area I2 is reconstructed on the photosensor assembly 14. As a result the photosensor assembly 14 provides a 4-bit signal representative of the information corresponding to the information unit or numeral and a 1-bit signal representative of a parity bit information recorded in the information unit area I2 of the card CD. This 4-bit signal of the information unit area I2 likewise makes the counter 22 count up by one again and is entered through the buffer 26 into a new address or cell positions of the register 28 specified by the counter 22. Write-in of the 4-bit signal of the information unit or numeral in the information unit area of the card is repeated as the card CD is further transported, until the last information hologram area I6 of the card CD comes to the same position as the opening 52. As a result a total of six 4-bit signals, in the illustrated embodiment are stored in the card register 28. It is understood that the said six 4-bit signals stored in the register 28 are representative of the 6-digit numerical information as recorded or stored in the form of hologram in the identification card CD shown in FIG. 2.

The photo detection device 15 is so positioned as to provide an output responsive to the leading edge of the card CD when the card is brought into the innermost position and the last information unit hologram area 16 of the card comes to the same position as the opening 52. The output thus obtained from the photo detection device 15 is fed through a wave shaping circuit 36 to a wrong insertion checking circuit 40. More specifically, the circuit 40 comprises an inhibit circuit 41 and a memory device 42 such as a flip flop. Assuming that the count output of six is provided from the counter when the card is brought into the innermost insertion position and the last information unit area 16 is sensed by the reconstruction system, the inhibit circuit 41 inhibits the output of the device 15 from being fed to the flip flop, resulting in no display in a "REPEAT" display 37, which means the proper insertion of the card CD into the receptacle 12. On the contrary, assuming that the count output of six is not available from the counter 22 in such an eventual insertion position of the card, the inhibit circuit 41 allows the output from the device 15 to pass therethrough to set the flip flop 42 and drive the "REPEAT" display 37 to indicate the wrong insertion of the card or necessity of repeated insertion. In this connection it is to be pointed out that the distance from the opening 52 to the photo detection device 15 in the receptacle 12 and the distance from the last information unit area 16 to the leading edge of the card CD should be the same, as shown denoted as a reference character L in FIGS. 2 and 6. It is further to be pointed out that for the purpose of accurate sensing of each information unit hologram in each unit area by means of the holography reconstruction system 50 the width a of the information unit hologram area is preferred to be less than the space b between two adjacent hologram areas, as shown in FIG. 2. The "REPEAT" display is also enabled by an output of a parity checker 35 which is operable in response to an output of the wave shaping circuit 24, in the event of wrong sensing or processing of the above-mentioned bit signals.

After the card CD is properly inserted into the receptacle 12 and all the bit signals of the information unit areas of the card are stored in the card register 28, the corresponding identification information or identification number being normally memorized by a card holder is entered into the system. For this purpose an operator depresses a key board 30 for writing in the identification number in the order of digit of the number. At the beginning the counter 23 is again reset or cleared. The write-in of the numerical information of the first digit makes the counter 23 count up by one similarly to that described previously in conjunction with the counter 22. The first digit numerical information is also encoded into the similar bit signal by an encoder 27 and stored in the buffer 26 tentatively. The bit signal stored in the buffer is then written in a key register 29 as a function of the count output from the second counter 23 in a similar manner as described in conjunction with the counter 22 and the register 28. The respective digit information is in turn written in the register 29 through repetition of the abovementioned write-in to store the numerical information of the identification number therein. The information stored in the register 29 is displayed by a key input display 31.

When both registers 28 and 29 are loaded with the bit signal obtained from the card CD and the bit signal entered manually by means of the key board 30, the control 25 activates a compare circuit 32 in a well-known manner. As a result, a "GO" display 34 is enabled to indicate that the card holder is true or a "NO" display 33 is enabled to indicate that the card holder is false, as the case may be.

Referring to FIG. 8, there is shown a perspective view of a card verification apparatus of the embodiment in accordance with the present invention, as described in conjunction with FIGS. 6 and 7. Therefore, the same portions, as viewed in FIG. 8, are denoted by the same reference characters and a more detailed description is not considered necessary.

In the foregoing the present invention has been described as embodied in a card identification system using holography. It is understood, however, that the present invention can be used in any applications which involve entering the information contained in the information record medium using holography into an electronic information processing system.

While specific preferred embodiments of the present invention have been described, it will be apparent that obvious variations and modifications of the invention will occur to those of ordinary skill in the art from a consideration of the foregoing description. It is, therefore, desired that the present invention be limited only by the appended claims. What is claimed is:

1. An information input system using holography comprising:

an information record medium having at least a piece of information represented by a plurality of discrete information unit areas arraged in a given combination and in a given direction, each processed individually for recording a hologram comprising an optical pattern representative of the corresponding information unit, each said information unit being a selected one of a plurality of characters whereby the combination of characters represented by said plurality of holograms in said combination and in said direction forms said piece of information comprising said combination of characters, a holography reconstruction system adapted to reconstruct the original optical pattern of the hologram of each information unit area, means for scanning the information record medium by said holography reconstruction system in said direction of arrangement of the information unit holograms in the medium for sensing each information unit hologram on a unit-by-unit basis successively by said holography reconstruction system in the course of scanning, and means responsive to a reconstructed optical pattern of each information unit hologram formed by said holography reconstruction system for providing a signal representative of the character of the corresponding information unit as the medium is scanned.

2. An information input system in accordance with claim 1, in which said optical pattern representative of the corresponding information unit is machine readable.

3. An information input system in accordance with claim 2, in which said machine readable optical pattern comprises a combination of a logical state in a plurality of bit positions for representing the corresponding information unit, said bit position being common to all information units, and said means for providing a signal representative of the corresponding information unit comprises a plurality of photosensitive devices, each positioned so that the logical state in each bit position in the original optical pattern may be sensed by the corresponding device.

4. An information input system in accordance with claim 1, in which each information unit hologram is a Fraunhofer hologram, and the holography reconstruction system employs a Fraunhofer holography reconstruction system.

5. An information input system in accordance with claim 1, in which said information record medium comprises a plurality of information unit hologram areas arranged spaced apart from each other.

6. An information input system in accordance with claim 5, in which the width of each hologram area is smaller than the space between two adjacent hologram areas.

7. An information input system in accordance with claim 3, in which said combination of a logical state in a plurality of bit positions comprises a logical state in parity bit position, said means for providing a signal representative of the corresponding information unit comprises a photosensitive device for sensing the logical state in the parity bit position, and a parity check means operable by the use of said parity bit output is further provided.

8. A card identification system using holography comprising;

a card having identification information comprising a plurality of information unit areas arranged in a given direction, each recorded in a hologram based on an optical pattern representative of the corresponding information unit, a holography reconstruction system adapted to reconstruct the original optical pattern of the hologram of each information unit area, means for scanning the card with respect to said holography reconstruction system in said direction of arrangement of the information unit areas in the card for sensing each information unit hologram in turn by said holography reconstruction system in the course of scanning of the card, means responsive to a reconstructed optical pattern of each information unit hologram formed by said hologram reconstruction system for providing a signal representative of the corresponding information unit as the card is scanned, means for manual entry of the corresponding identification information for providing another signal representative thereof, and means for comparing both signals obtained from the card and manually entered for making verification of the card.

9. A card identification system in accordance with claim 8, in which said optical pattern representative of the corresponding information unit is machine readable.

10. A card identification system in accordance with claim 9, in which said machine readable optical pattern comprises a combination of a logical state in a plurality of bit positions for representing the corresponding information unit, said bit position being common to all information units, and said means for providing a signal representative of the corresponding information units comprises a plurality of photosensitive devices, each positioned so that the logical state in each bit position in the original optical pattern may be sensed by the corresponding device.

11. A card identification system in accordance with claim 8, in which said scanning means comprises means for causing relative displacement of the card with respect to said holography reconstruction system in said direction of arrangement of the information unit areas in the card for sensing each information unit hologram in turn by said holography reconstruction system in the course of relative displacement of the card.

12. A card identification system in accordance with claim 11, in which said card displacement means comprises a member for receiving the card in the direction of the arrangement of the information unit in the card for permitting gradual insertion thereinto through manual depression.

13. A card identification system in accordance with claim 12, in which said card receiving member comprises a window adapted for each information unit contained in the card as the card is inserted into the card receiving member, and said holography reconstruction system is so mounted that the system senses the hologram pattern of the card through said window.

14. A card identification system in accordance with claim 11, in which there is provided a means for counting the number of information unit contained in the card as a function of the signal obtained by the card, said card displacement means comprising a means for sensing the extreme displacement of the card in the displacement means, and there is further provided a means for indicating the sensing of all information units in the card when the card is brought into the extreme displacement position.

15. A card identification system in accordance with claim 8, in which the hologram of the card is a Fraunhofer hologram, and the holography reconstruction system employs a Fraunhofer holography reproduction system.

16. A card identification system in accordance with claim 8, in which said card has said plurality of hologram areas arranged spaced apart from each other.

17. A card identification system in accordance with claim 16, in which the width of each hologram pattern area is smaller than the space between two adjacent hologram areas.

18. A card identification system in accordance with claim 10, in which said combination of a logical state in a plurality of bit positions comprises a logical state in a parity bit position, said means for providing a signal representative of the corresponding information unit comprises a photosensitive device for sensing the logical state in the parity bit position, and a parity check means operable by the use of said parity bit output is further provided.

19. In a holographic scanning system for use with an optically verifiable card for displaying character information in holographic form, said card including a plurality of discrete holograms arranged in a given combination in a plane along said card for scanning of successive holograms in a predetermined direction by electromagnetic waves;

each said hologram bein selected from a plurality of characters whereby said plurality of holograms in said combination form a piece of information by said plurality of characters;

the improvement which comprises:

means for holographically reconstructing said holograms by directing electromagnetic waves through each of said holograms successively to present a reconstructed holographic display for each hologram; and means for sensing each said reconstructed holographic display and providing an output signal representative of each said holographic display as the card is scanned.

20. The system of claim 19 wherein each said hologram can be holographically reconstructed as an optical dot pattern, whereby scanning each hologram by an electromagnetic reconstruction system provides an optical signal representative of the character.

21. The system of claim 19 wherein the information unit comprises a Fraunhofer-type phase hologram.

22. The system of claim 19 wherein the electromagnetic waves consist essentially of white light.

23. A holographic scanning system for use with an information card for displaying alphanumeric character information in holographic form, wherein the card includes a plurality of discrete transparent holograms arranged in a given combination and in a given common direction along said card for individual, successive scanning thereof by electromagnetic waves, each said hologram being representative of a selected one of a plurality of characters whereby said plurality of holograms in said combination and in said direction form a predetermined piece of information, which comprises:

means for scanning the plurality of holograms of a card individually and in succession, said scanning means including means for directing electromagnetic waves through a hologram thereby to present a reconstructed holographic display for the hologram comprising an optical binary bit pattern of predetermined bit positions; and photosensor means for sensing the binary bit pattern of each said reconstructed holographic display and providing an electrical output signal representative thereof for each of said individually and successively scanned holograms of a card.

* * * * *